United States Patent [19]
Nishimura

[11] Patent Number: 5,697,007
[45] Date of Patent: Dec. 9, 1997

[54] APPARATUS PROVIDED WITH A CARTRIDGE INDICATING MECHANISM

[75] Inventor: Tomoki Nishimura, Kawasaki, Japan

[73] Assignee: Nikon Corporation, Tokyo, Japan

[21] Appl. No.: 604,705

[22] Filed: Feb. 21, 1996

[30] Foreign Application Priority Data

Feb. 23, 1995 [JP] Japan ..................... 7-035751

[51] Int. Cl.$^6$ ................................. G03B 17/02
[52] U.S. Cl. ................... 396/535; 396/536; 396/538
[58] Field of Search ...................... 354/174, 275, 354/288, 21; 396/439, 535, 536, 537, 538

[56] References Cited

U.S. PATENT DOCUMENTS

| | | | |
|---|---|---|---|
| 4,707,096 | 11/1987 | Lawther | 354/215 |
| 5,155,514 | 10/1992 | Tamamura | 354/174 |
| 5,323,201 | 6/1994 | Richiuso et al. | 354/288 |
| 5,473,401 | 12/1995 | Tsunefuji | 354/288 |

FOREIGN PATENT DOCUMENTS

| | | |
|---|---|---|
| A-5-100300 | 4/1993 | Japan . |
| A-5-158125 | 6/1993 | Japan . |

Primary Examiner—Eddie C. Lee
Attorney, Agent, or Firm—Oliff & Berridge

[57] ABSTRACT

An apparatus is provided which comprises a cartridge chamber into which a film cartridge is loaded in the direction of its longitudinal axis, an eject member that can move between a housing position, at which the film cartridge loaded in the film cartridge chamber is held inside the film cartridge chamber, and a take-out position, at which the film cartridge that is loaded is projected out through an insertion opening of the cartridge chamber, a connecting member than can move between a connecting position at which the eject member located at the housing position is prevented from moving to the take-out position and a connection release position at which the eject member is allowed to move to the take-out position, and an indicating mechanism that indicates whether or not the film cartridge is loaded inside the cartridge chamber with the movement of the connecting member.

11 Claims, 7 Drawing Sheets ial surface of the cartridge chamber, loading/
removing of the cartridge is not affected in any adverse
manner whatsoever.

APPARATUS PROVIDED WITH A CARTRIDGE INDICATING MECHANISM

BACKGROUND OF THE INVENTION

1. Field of the Invention

The present invention relates to an apparatus such as a camera, into which a film cartridge can be loaded in the direction of its longitudinal axis and which is capable of indicating whether or not a film cartridge is loaded.

2. Description of the Related Art

A camera in the prior art into which a film cartridge is loaded in the direction perpendicular to its axis after opening a rear lid provided on the back surface of the camera body, is usually provided with a cartridge verifying window at a specific position at the rear lid. When the back lid is closed after a cartridge has been loaded, a portion of the cartridge circumferential surface can be visually observed through the verifying widow and, thus, the presence/absence of a cartridge can be verified. On the internal surface of the back lid of this type of camera, a light-blocking member is provided around the entire edge of the verifying window and when the back lid is closed, the light-blocking member comes in close contact with the cartridge circumferential surface to prevent outside light from entering the cartridge chamber through the verifying window.

Also known in the prior art is a camera that adopts a system in which a film cartridge is loaded in the direction of its longitudinal axis. If a verifying window such as that described above is provided, through which the circumferential surface of the cartridge can be observed when a cartridge is loaded, it is necessary to provide a light-blocking member on the internal circumferential surface of the cartridge chamber. In this case, the circumferential surface of the cartridge slides against the light-blocking member when the cartridge is being loaded or removed and, due to the sliding resistance, the cartridge cannot move smoothly.

A camera in which this sliding resistance caused by the light-blocking member is eliminated is disclosed in Japanese Laid-Open Publication Serial No. 5-100300. This camera comprises a verifying window provided on an external cover of the camera; a mobile member provided with a through hole facing opposite the verifying window and a light-blocking member provided around the through hole, which is capable of traveling between the contact position, at which the light-blocking member comes in contact with the circumferential surface of the cartridge, and a separated position, at which the light-blocking member is away from the circumferential surface of the cartridge; a spring which applies force to the mobile member toward the separated position; a cam member that causes the mobile member to move to the contact position by interlocking with the cartridge being loaded into the cartridge chamber; and a light-blocking cylinder that connects between the verifying window and the through hole of the mobile member.

Also, Japanese Laid-Open Publication Serial No. 5-158125 discloses a camera provided with a indicating plate for indicating the presence/absence of a cartridge and a spring that applies force to this indicating plate in a specific direction, which indicates the presence/absence of a cartridge by causing the indicating plate to travel against the force applied by the spring during a loading operation in which a cartridge is loaded into the cartridge chamber.

However, with the camera disclosed in Japanese Laid-open Publication Serial No. 5-100300, the mobile member, the spring, the cam member and the light-blocking cylinder are all members that must be newly added to achieve indication of the load status of a cartridge, resulting in an increase in the number of parts, an increase in production costs and a larger camera.

SUMMARY OF THE INVENTION

An object of the present invention is to ensure that, in the type of apparatus into which a film cartridge is loaded in the direction of its longitudinal axis, the presence/absence of a cartridge can be verified with a simple structure, without sacrificing the light-blocking characteristics and without affecting the loading/removing of a cartridge in any adverse manner whatsoever.

In order to achieve the object described above, an apparatus according to the present invention comprises a cartridge chamber into which a film cartridge is loaded in a direction of its longitudinal axis, an eject member that can move between a housing position, at which the film cartridge loaded in the film cartridge chamber is held inside the film cartridge chamber, and a take-out position, at which the film cartridge that is loaded is projected out through an insertion opening of the cartridge chamber, a connecting member that can move between a connecting position, at which the eject member located at the housing position is prevented from moving to the take-out position, and a connection release position, at which the eject member is allowed to move to the take-out position, and an indicating mechanism provided outside the cartridge chamber, that indicates whether or not the film cartridge is loaded inside the cartridge chamber with movement of the connecting member.

According to the present invention, an indication as to whether or not a film cartridge is loaded inside the cartridge chamber is made with the connecting member moving to prohibits/allows removal of a film cartridge. As a result, even in an apparatus into which a film cartridge is loaded in the direction of its longitudinal axis, the presence/absence of the cartridge can be verified with a simple structure. In addition, since the connecting member is provided outside the cartridge chamber, its movement does not cause light to enter the cartridge chamber. Furthermore, since it is not necessary to provide a light-blocking member on the internal circumferential surface of the cartridge chamber, loading/removing of the cartridge is not affected in any adverse manner whatsoever.

DETAILED DESCRIPTION OF THE PREFERRED EMBODIMENTS

An embodiment in which the present invention is adopted in a camera is explained in reference to FIGS. 1–5.

Figure 1:
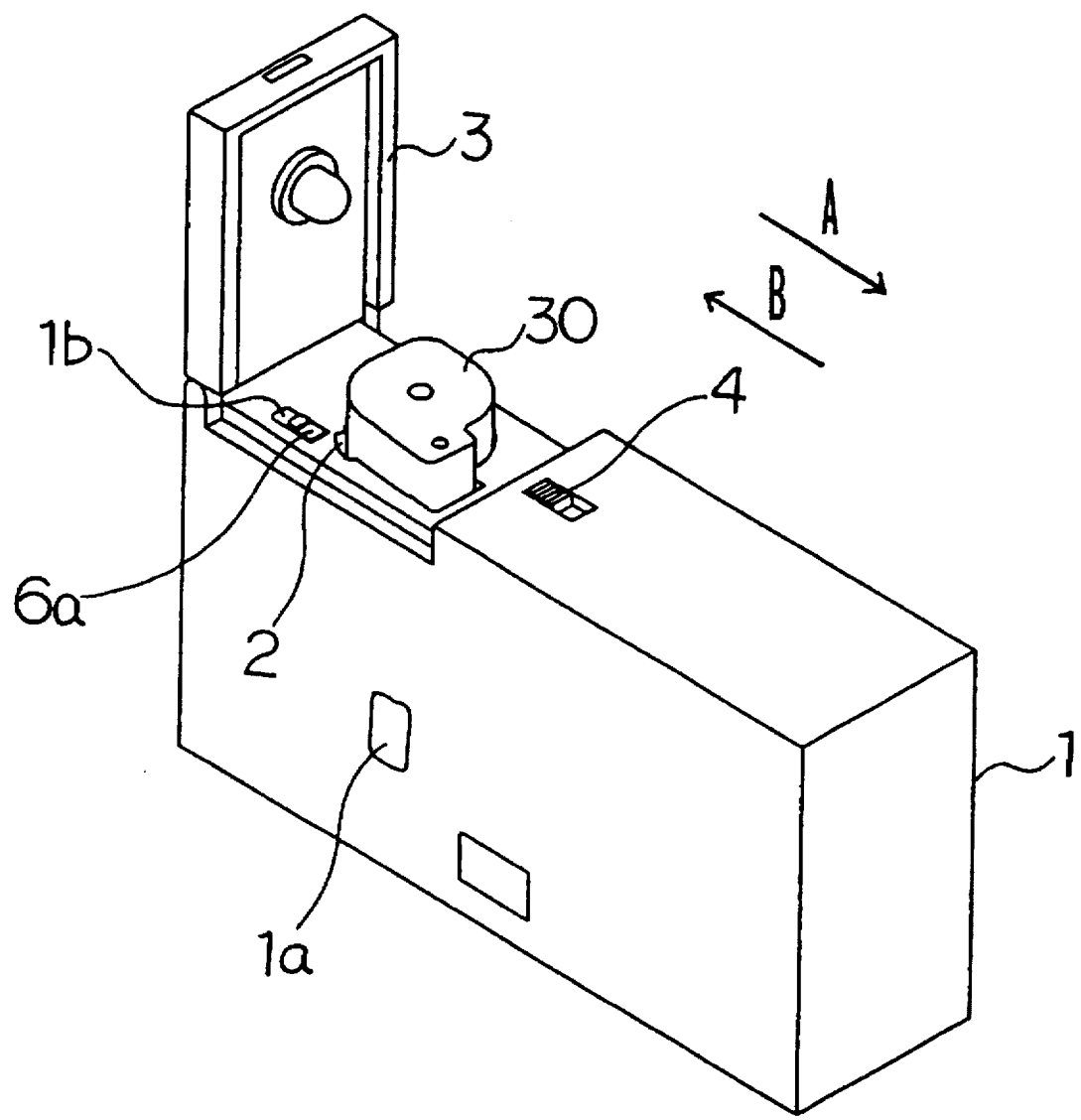
FIG. 1 is a perspective of a camera in one embodiment according to the present invention, viewed from the bottom.
Figure 2:
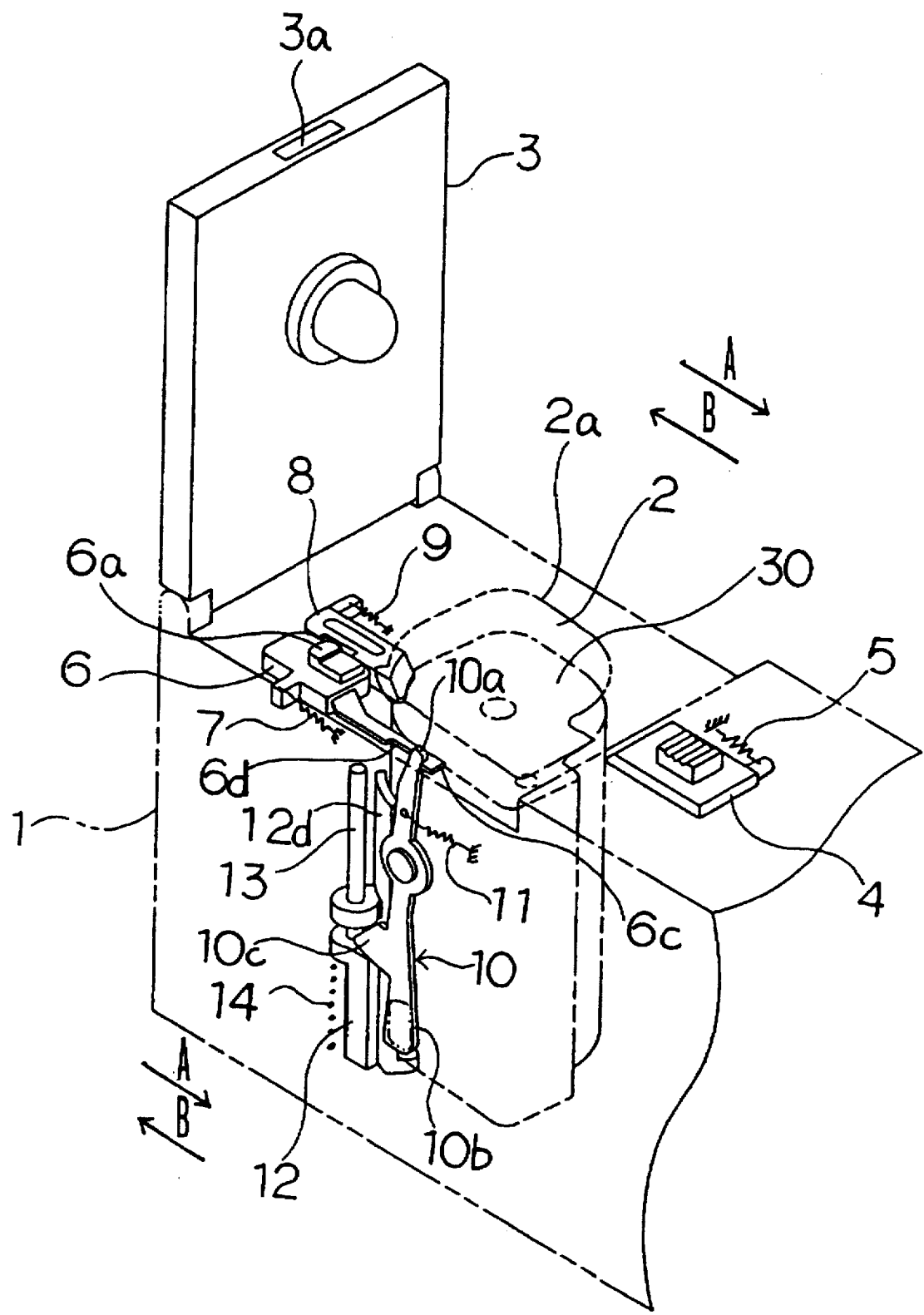
FIG. 2 is a perspective showing the structure of the essential portion of the camera above.

FIG. 1 is a perspective of a camera in an embodiment, viewed from the bottom and FIG. 2 is a perspective showing the structure of the essential portion of this camera.

A cartridge chamber 2 is provided at one end of a camera body 1, and its insertion opening 2a is provided at the bottom surface of the camera. Through this insertion opening 2a, a film cartridge 30 is loaded into the cartridge chamber 2 in the direction of its longitudinal axis.

A cartridge chamber lid 3 for opening/closing the cartridge chamber 2 is mounted on the bottom surface of the camera main body, in such a manner that it can rotate and an operating member 4 that is operated to open this cartridge chamber lid 3 are provided at the bottom surface of the camera body 1. By operating the operating member 4 in direction A in the figures against the force applied by a spring 5 when the cartridge chamber lid is closed, it becomes possible to open the cartridge chamber lid 3.

Figure 3:
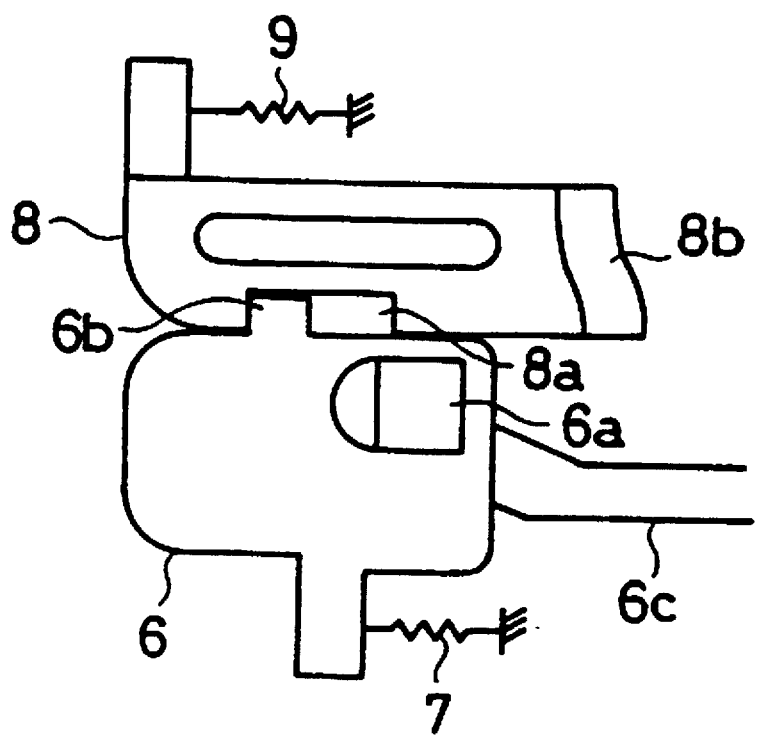
FIG. 3 is a plan view of a cartridge take-out member 6 and a cartridge stopper 8.

In the vicinity of the insertion opening 2a of the cartridge chamber 2, a cartridge take-out member 6 is provided and, as shown in FIG. 1, an operating portion 6a of this take-out member 6 projects out through a longitudinal hole 1b of the camera body 1. A force is applied to the take-out member 6 in direction A in the figures by a spring 7 and the take-out member 6 is allowed to slide a specific distance in direction B with the operation of the operating portion 6a. A cartridge stopper 8 is provided at a side of the take-out member 6 and, as shown in FIG. 3, a projection 6b formed in the take-out member 6 is connected in a groove 8a formed in the stopper 8.

The stopper 8 can slide in directions A and B in the figures and a force is applied to the stopper 8 in direction A by a spring 9. A front end portion 8b of the stopper 8 normally projects out into the cartridge insertion opening 2a and even if the insertion opening 2a is turned downward while a cartridge 30 is loaded, the cartridge 30 is prevented from falling out by the front end portion 8b. In addition, with the effect of an inclined surface formed on the upper surface at the front end portion 8b in the figure, when the cartridge 30 is being loaded, the stopper 8 is automatically caused to slide in direction B by the cartridge 30, to allow the loading thereof.

A connecting notch 6d is formed in a connecting portion 6c which projects in direction A at an end surface of the take-out member 6, and a connecting portion 10a at one end of a connecting lever 10 is connected to this connecting notch 6d. The lever 10 is provided in a space between an external cover of the camera body 1 and a side wall of the cartridge chamber 2 and is capable of pivoting between the position shown in FIG. 4 and the position shown in FIG. 5 on the axis X. Reference number 11 indicates a spring that applies force to the lever 10 in the clockwise direction in the figures.

Another end portion 10b of the lever 10 functions as a indicating portion for indicating whether or not a cartridge 30 is loaded in the cartridge chamber 2. A window 1a is formed at the position which corresponds to the position of the indicating portion 10b in the external cover of the camera body 1 and transparent resin is mounted in the window 1a. The indicating portion 10b is capable of taking both a position at which visual verification through the window 1a is not possible (FIG. 4) and a position at which visual verification is possible (FIG. 5), depending upon the pivoting state of the lever 10.

In addition, in the lever 10, a tab portion 10c is formed, which comes in contact with a cartridge eject member 12 provided at its side. The eject member 12 is provided with a guide portion 12a, which is externally fitted on a guide shaft 13 provided standing upright inside the camera body 1. The guide portion 12a can slide on the shaft 13, so the eject member 12 can travel in the vertical direction in the figure. A force is applied to it in the upward direction in the figure (toward the camera bottom) by a spring 14 externally fitted on the guide shaft 13. A support portion 12b for supporting a loaded cartridge 30 is formed in the eject member 12, and this support portion 12b extends through a longitudinal groove formed on a side wall of the cartridge chamber 2 to project out into the cartridge chamber 2. Reference number 12d indicates a light-blocking portion which is an integrated part of the eject member 12, and is provided covering the longitudinal groove. In the state shown in FIG. 5, some external light enters the camera body 1 through the gap between the window 1a and the indicating portion 10b. However, the light is blocked by the light-blocking member 12d of the eject member 12 and never enters the cartridge chamber 2.

Furthermore, a connecting portion 12c, which connects with the tab portion 10c of the lever 10, is formed in the eject member 12. As the cartridge 30 is loaded, the eject member 12 is driven to the position shown in FIG. 5 and, at this point, the upper surface of the connecting portion 12c comes in contact with the tab portion 10c of the lever 10 to prevent the eject member 12 from moving in the upward direction in the figure.

Next, the operation of the embodiment is explained.

Figure 4:
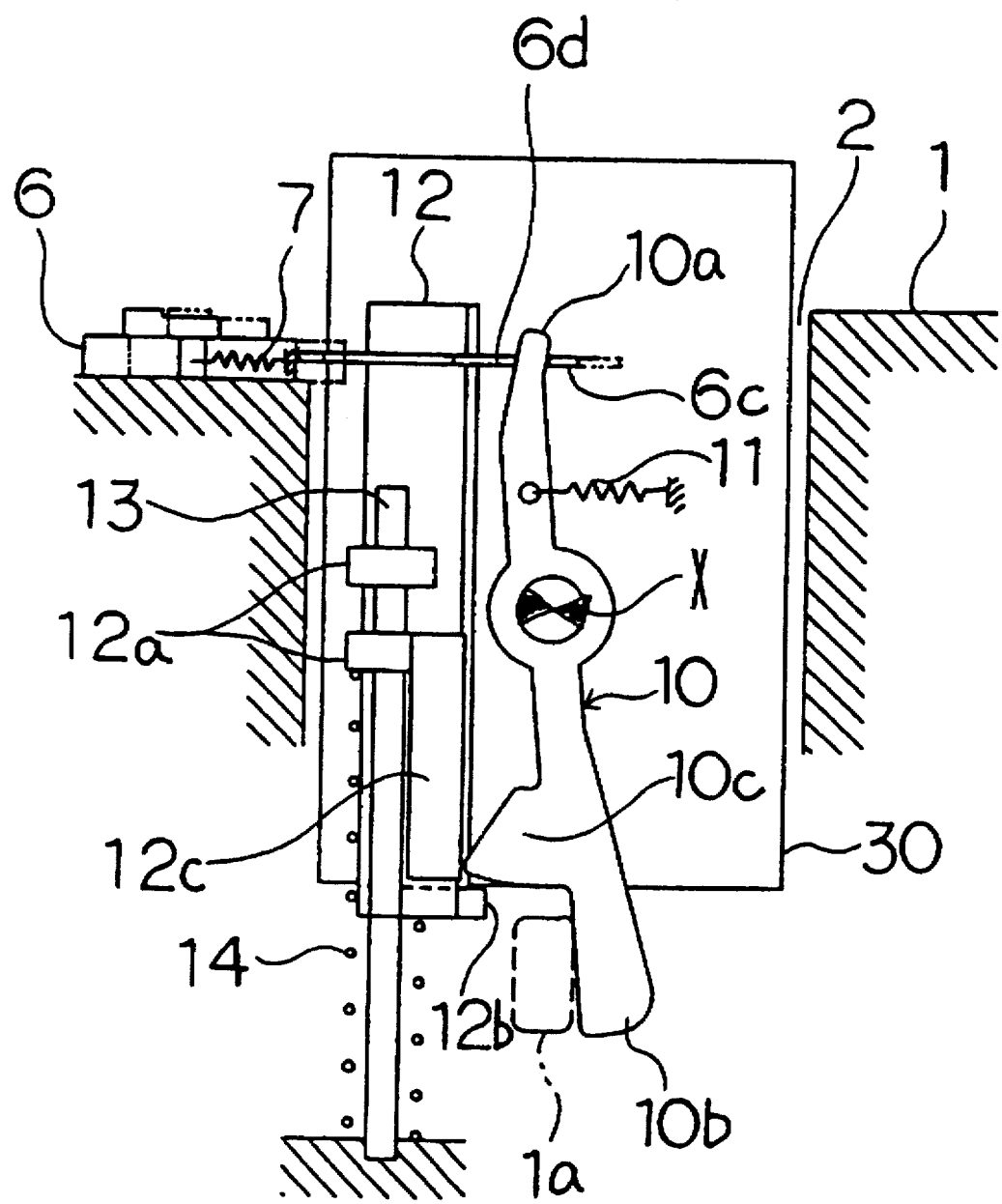
FIG. 4 is a cross-section showing a state in which a cartridge is being removed.

When a cartridge is not loaded, the lever 10 and the eject member 12 are at the positions shown in FIG. 4 and, with the front end of the tab portion 10c of the lever 10 in contact with a side surface of the connecting portion 12c, the lever 10 is prevented from pivoting in the clockwise direction in the figure. As a result, the indicating portion 10b of the lever 10 is away from the verifying window 1a and cannot be observed through the window 1a. Thus, it is indicated that no cartridge 30 is loaded in the cartridge chamber 2. Note that at this point, the cartridge take-out member 6 takes the position indicated by the 2-point chain line in FIG. 4.

In this state, the operating member 4 is operated to open the cartridge chamber lid 3 and the cartridge 30 is loaded into the cartridge chamber 2 through the insertion opening 2a in the direction of its longitudinal axis. While, initially, the front end portion 8a of the stopper 8 projects out into the insertion opening 2a, when the cartridge 30 is inserted, it automatically withdraws from the opening 2a due to the effect of the inclined surface. At this time, since the projection 6b of the take-out member 6 makes relative movement within the groove 8a of the stopper 8, the take-out member 6 does not travel in direction B. When the cartridge 30 is inserted to the position indicated in FIG. 4, the lower portion of the cartridge 30 in the figure comes in contact with the support portion 12b of the eject member 12 and subsequently, the eject member 12 moves together with the cartridge 30 against the force applied by the spring 14. During this process, the support portion 12b travels through the longitudinal groove of the cartridge chamber 2.

Figure 5:
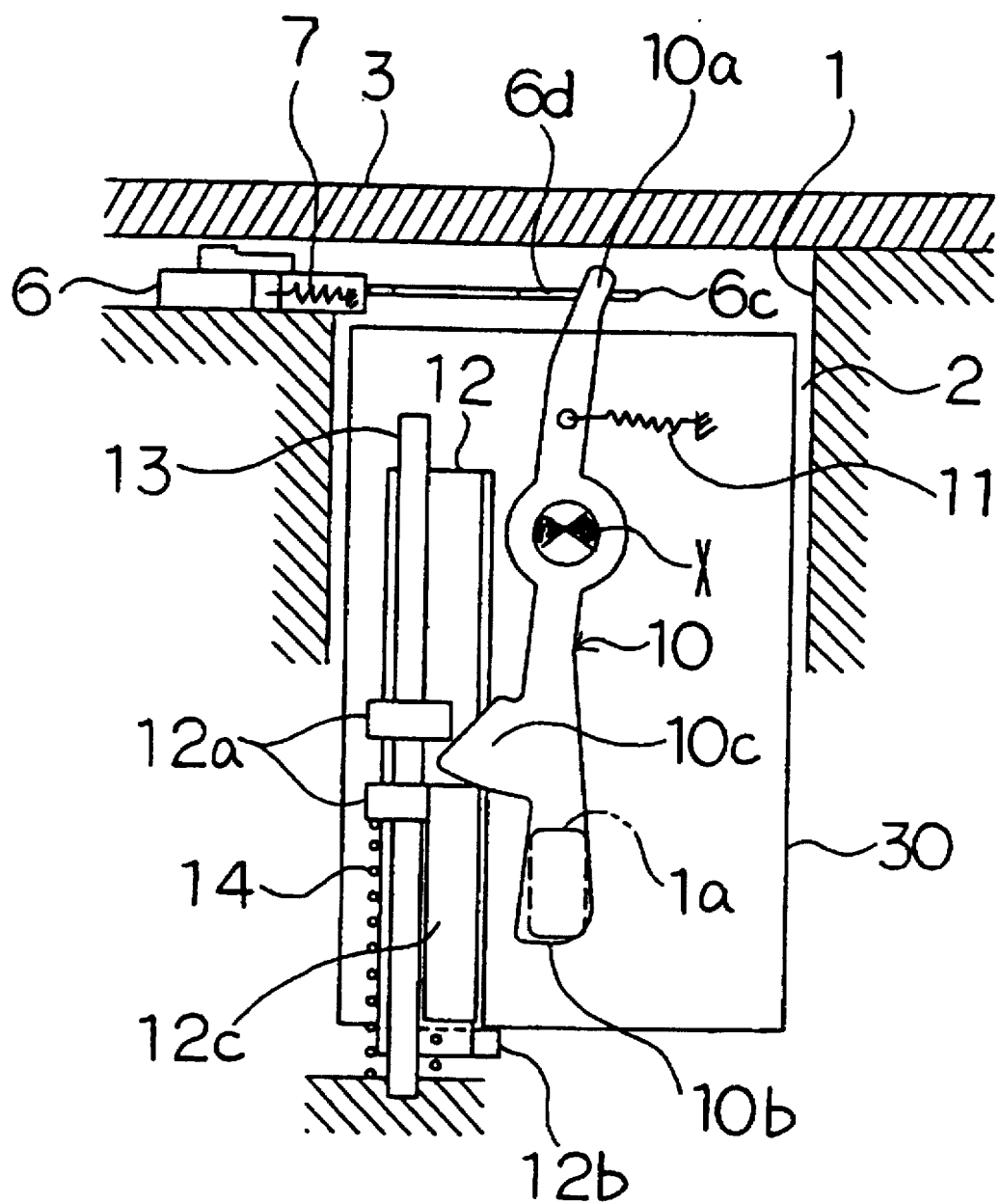
FIG. 5 is a cross-section showing a state in which a cartridge is being loaded.

When the cartridge 30 is loaded to the position shown in FIG. 5, the cartridge 30 moves away from the stopper 8 and, as a result, the stopper 8 returns to the position indicated in FIG. 3 due to the force applied by the spring 9 and the front end portion 8b projects out into the insertion opening 2a. Also, at this time, since a side surface of the connecting portion 12c of the eject member 12 has moved away from the tab portion 10c of the lever 10, the lever 10 pivots in the clockwise direction because of the force applied by the spring 11 to the position indicated in FIG. 5. With this, the indicating portion 10b of the lever 10 moves to a position at which it can be observed through the verifying window 1a and thereby indicates that a cartridge 30 is loaded in the cartridge chamber 2. Note that since the connecting portion 10a moves inside the connecting notch 6b of the take-out member 6 while the lever 10 pivots, the operating member 6 remains stationary.

Since, the lower surface of the tab portion 10c of the lever 10 comes in contact with the upper surface of the connecting portion 12c of the eject member 12 with the pivoting movement of the lever 10, the eject member 12 is prevented from projecting out upward in the figure and the cartridge 30 is held at the loaded position. Even if the camera is held upside down, at this point, with the cartridge chamber 3 open, the cartridge 30 is prevented from falling out by the front end portion 8b of the stopper 8.

When a specific operation is performed after closing the cartridge chamber lid 3, film (not shown) inside the cartridge 30 is loaded and the operation enters the photo-ready state.

When taking the cartridge 30 out of the cartridge chamber 2, the cartridge chamber lid 3 is opened and through the operation of the operating portion 6a, the take-out member 6 is caused to move in direction B against the force applied by the spring 7. This causes the stopper 8 to move in direction B against the force applied by the spring 9 via the projection 6b (FIG. 3) and the front end portion 8b withdraws from the insertion opening 2a. Also, with the movement of the take-out member 6 in direction B, the wall surface of the connecting notch 6d operates the connecting portion 10a of the lever 10 to pivot the lever 10 in the counter-clockwise direction. This causes the indicating portion 10b of the lever 10 to withdraw from the indicator window 1a, thereby indicating that no cartridge is loaded. In addition, with the pivoting of the lever 10, the tab portion 10c withdraws from the upper surface of the connecting portion 12c of the eject member 12, allowing the eject member 12 to move upward in the figure with the force applied by the spring 14. As a result, as shown in FIG. 4, the upper portion of the cartridge 30 projects out of the insertion opening 2a, and a state in which the cartridge 30 can be taken out is achieved.

When the operating portion 6a is released, the take-out member 6 returns to its original state due to the force applied by the spring 7, and when the cartridge 30 is taken out, the stopper 8, too, returns to its original position. The tab portion 10c of the lever 10 is in contact with a side surface of the connecting portion 12c of the eject member 12 and prevents the lever 10 from pivoting in the clockwise direction. Thus, even when the cartridge 30 is taken out, the indicating portion 10b maintains the state in which it indicates that no cartridge is loaded.

Note that by applying paint or printing on the indicating portion 10b, the presence/absence of a cartridge can be determined immediately and reliably.

Figure 6:
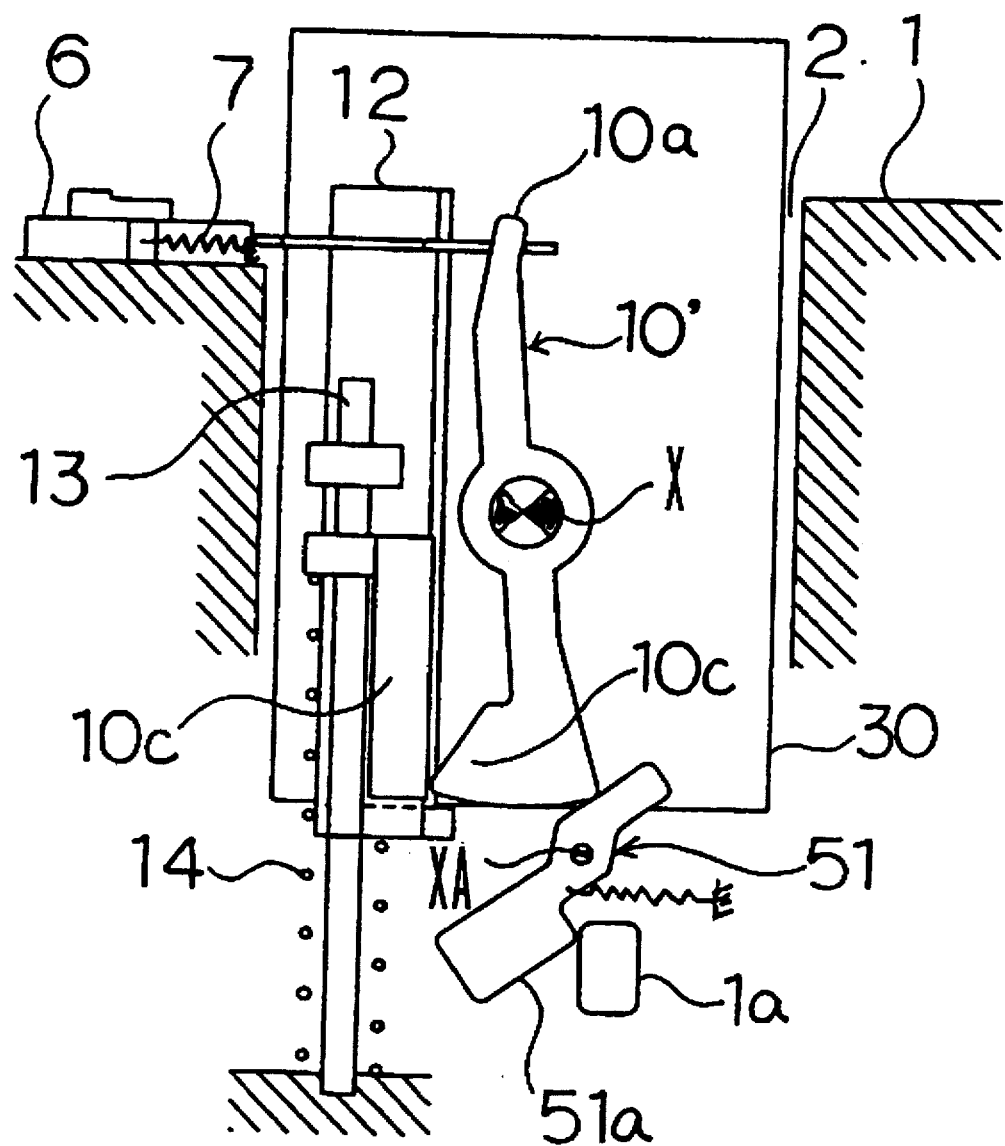
FIG. 6 is a cross-section showing a state in which a cartridge is being removed in a camera in another embodiment.
Figure 7:
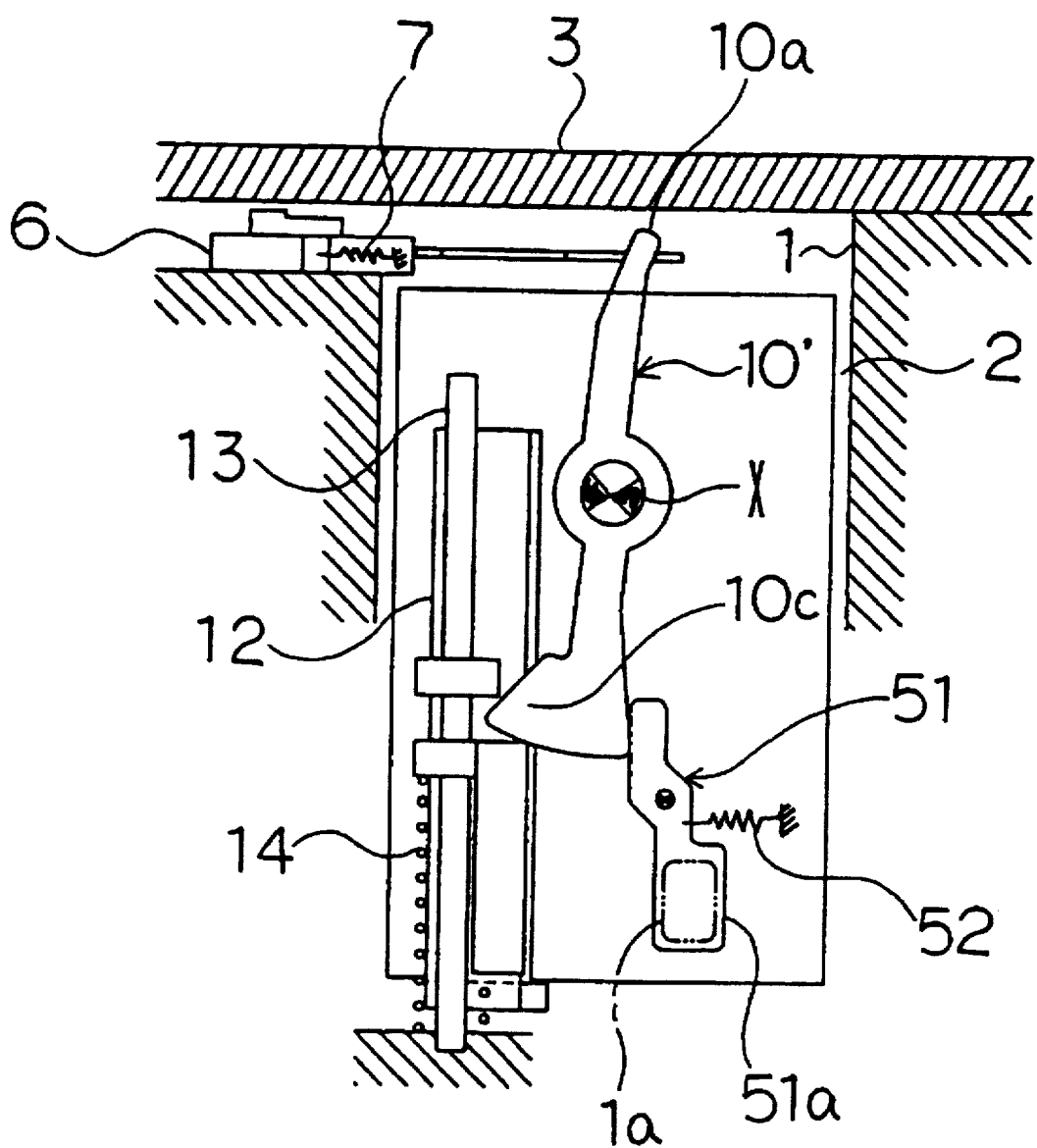
FIG. 7 is a cross-section showing a state in which a cartridge is being loaded in the camera shown in FIG. 6.

While an example in which the indicating portion for indicating the presence/absence of a cartridge is provided as an integrated part of the lever has been explained so far, FIGS. 6 and 7 show another embodiment in which these are constituted as separate members. An indicator member 51 which is connected to a lever 10 can pivot on an axis XA and a force is applied to it in the counter-clockwise direction by a spring 52. When the lever 10 is driven to the take-out position in FIG. 6 with the eject member 12 elevated, the indicator member 51 is caused to turn in the clockwise direction by the lower end portion of the lever 10 against the force applied by the spring 52 and one of its end portions, i.e., an end portion 51a, withdraws to a position at which it cannot be observed through the window 1a. When the lever 10 is allowed to pivot from the take-out position to the housing position as the eject member 12 is lowered, the indicator member 51 rotates in the counter-clockwise direction while causing the lever 10 to pivot in the clockwise direction due to the force applied by the spring 52 as shown in FIG. 7, and the one end portion 51a moves to a position at which it can be observed through the window 1a. Other structural features are identical to those of the first embodiment.

Note that while in the above embodiments the presence/absence of a cartridge is indicated by moving the indicating portion between a position at which it can be observed and a position at which it cannot be observed, the present invention may be structured so that, for instance, when a cartridge is loaded, a first portion of the indicating portion can be observed through the window and when no cartridge is loaded, a second portion can be observed. In that case, by having different colors for the first portion and the second portion, or by printing characters such as "loaded" and "empty" in the first and second portions respectively, the presence/absence of a cartridge can be determined immediately. Furthermore, instead of an indication made by using a window, a member which rotates in correspondence to the pivoting of the lever 10 may be exposed on the external portion of the camera main body to indicate the presence/absence of a cartridge depending upon the rotation position of this rotating member. In addition, while the explanation has been given using a camera as an example, the present invention may be adopted in apparatuses other than cameras, such as an apparatus which performs magnetic recording on film.

I claim:

1. An apparatus, comprising:

a main body having an external cover;

a cartridge chamber in the main body and into which a film cartridge is loaded in a direction of a longitudinal axis thereof;

an eject member that is capable of moving between a housing position, at which said film cartridge loaded in said film cartridge chamber is held inside said film cartridge chamber, and a take-out position, at which said film cartridge that is loaded is projected out through an insertion opening of said cartridge chamber, said eject member moving from said take-out position to said housing position with insertion of said cartridge;

a connecting member that is capable of moving between a connecting position, at which said eject member located at said housing position is prevented from moving to said take-out position, and a connection release position, at which said eject member is allowed to move to said take-out position, said connecting member being positioned at said connection release position when said eject member is positioned at said take-out position and moving from said connection release position to said connecting position with said eject member moving to said housing position;

an eject supporting member that moves said eject member from said housing position to said take-out position when said connecting member moves from said connecting position to said connection release position;

an indicating mechanism provided outside said cartridge chamber, that moves with movement of said connecting member to indicate whether said film cartridge is loaded inside said cartridge chamber; and a mechanism formed in the external cover and which enables a position of said indicating mechanism to be observed.

2. An apparatus, comprising:

a main body having an external cover;

a cartridge chamber in the main body and into which a film cartridge is loaded in a direction of a longitudinal axis thereof;

an eject member that is capable of moving between a housing position, at which said film cartridge loaded in said film cartridge chamber is held inside said film cartridge chamber, and a take-out position, at which said film cartridge that is loaded is projected out through an insertion opening of said cartridge chamber, said eject member moving from said take-out position to said housing position with insertion of said cartridge;

a connecting member, provided outside said cartridge chamber, that is capable of moving between a connecting position, at which said eject member located at said housing position is prevented from moving to said take-out position, and a connection release position, at which said eject member is allowed to move to said take-out position, said connecting member being positioned at said connection release position when said eject member is positioned at said take-out position and moving from said connection release position to said connecting position with said eject member moving to said housing position, said connecting member having an indicating portion which indicates that a film cartridge is loaded when said connecting member is at said connecting position and indicates that no film cartridge is loaded when said connecting member is at said connection release position; and a mechanism formed in the external cover which enables a position of said indicating portion to be observed.

3. An apparatus according to claim 2, wherein said mechanism is a verifying window through which the position of said indicating portion is able to be observed.

4. An apparatus according to claim 2, further comprising;

a spring member that drives said eject member to said take-out position when said connecting member moves to said connection release position.

5. An apparatus according to claim 2, further comprising;

a first spring member that drives said connecting member from said connection release position to said connecting position when said eject member is moved to said housing position, and holds said connecting member at said connecting position, an operating member which moves said connecting member to said connection release position against a force applied by said first spring member, a second spring member that drives said eject member to said take-out position when said connecting member moves to said connection release position, and a stopping member that stops said connecting member from moving from said connection release position to said connecting position when said eject member is at said take-out position.

6. An apparatus according to claim 5, wherein said mechanism is a verifying window through which the position of said indicating portion is able to be observed.

7. An apparatus, comprising:

a main body having an external cover;

a cartridge chamber in the main body and into which a film cartridge is loaded in a direction of a longitudinal axis thereof;

an eject member that is capable of moving between a housing position, at which said film cartridge loaded in said film cartridge chamber is held inside said film cartridge chamber, and a take-out position, at which said film cartridge that is loaded is projected out through an insertion opening of said cartridge chamber, said eject member moving from said take-out position to said housing position with insertion of said cartridge;

a connecting member that is capable of moving between a connecting position, at which said eject member located at said housing position is prevented from moving to said take-out position, and a connection release position, at which said eject member is allowed to move to said take-out position, said connecting member being positioned at said connection release position when said eject member is positioned at said take-out position and moving from said connection release position to said connecting position with said eject member moving to said housing position;

an indicating member provided outside said cartridge chamber that, when said connecting member is at said connecting position, is located at a position at which a fact that said film cartridge is loaded is indicated, and moves, with said connecting member moving to said connection release position, to a position at which a fact that said film cartridge is not loaded is indicated; and a mechanism formed in the external cover which enables a position of said indicating member to be observed.

8. An apparatus according to claim 7, wherein said mechanism is a verifying window through which the position of said indicating member is able to be observed.

9. An apparatus according to claim 7, further comprising;

a spring member that drives said eject member to said take-out position when said connecting member moves to said connection release position.

10. An apparatus according to claim 7, further comprising;

a first spring member that drives said connecting member from said connection release position to said connecting position when said eject member is moved to said housing position, and holds said connecting member at said connecting position, an operating member which moves said connecting member to said connection release position against a force applied by said first spring member, a second spring member that drives said eject member to said take-out position when said connecting member moves to said connection release position, and a stopping member that stops said connecting member from moving from said connection release position to said connecting position when said eject member is at said take-out position.

11. An apparatus according to claim 10, wherein said mechanism is a verifying window through which the position of said indicating portion is able to be observed.

* * * * *